(12) United States Patent
Hagiwara et al.

(10) Patent No.: US 8,541,321 B2
(45) Date of Patent: *Sep. 24, 2013

(54) COPOLYMERIZED POLYETHER POLYAMIDE RESIN

(75) Inventors: Hiroaki Hagiwara, Fukui (JP); Kenichiro Kano, Osaka (JP); Gaku Maruyama, Fukui (JP); Takahiro Hattori, Fukui (JP); Takashi Tsuruta, Shiga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 342 days.

This patent is subject to a terminal disclaimer.

(21) Appl. No.: 12/935,146

(22) PCT Filed: Oct. 16, 2008

(86) PCT No.: PCT/JP2008/068727
§ 371 (c)(1),
(2), (4) Date: Sep. 28, 2010

(87) PCT Pub. No.: WO2009/139087
PCT Pub. Date: Nov. 19, 2009

(65) Prior Publication Data
US 2011/0014833 A1 Jan. 20, 2011

(30) Foreign Application Priority Data
May 15, 2008 (JP) .................. 2008-128237

(51) Int. Cl.
*B32B 27/24* (2006.01)
*B60R 21/16* (2006.01)

(52) U.S. Cl.
USPC ............... 442/158; 442/76; 280/728.1

(58) Field of Classification Search
USPC ................ 442/76, 158; 280/728.1
See application file for complete search history.

(56) References Cited

U.S. PATENT DOCUMENTS

| | | | |
|---|---|---|---|
| 4,356,300 A | 10/1982 | Isler et al. | |
| 4,847,142 A * | 7/1989 | Twilley et al. | 442/291 |
| 6,291,040 B1 | 9/2001 | Moriwaki et al. | |
| 6,679,991 B1 | 1/2004 | Van Andel | |
| 7,795,161 B2 | 9/2010 | Kano et al. | |
| 7,985,702 B2 | 7/2011 | Kano et al. | |
| 7,994,076 B2 | 8/2011 | Kano et al. | |
| 2003/0060103 A1 | 3/2003 | Nagaoka et al. | |
| 2007/0031621 A1 | 2/2007 | Morimoto | |
| 2009/0274913 A1 | 11/2009 | Okushita et al. | |
| 2010/0260976 A1 | 10/2010 | Kano et al. | |
| 2010/0282358 A1 | 11/2010 | Kano | |
| 2011/0014833 A1 | 1/2011 | Hagiwara et al. | |
| 2011/0097955 A1 | 4/2011 | Kano et al. | |
| 2011/0097956 A1 | 4/2011 | Kano et al. | |

FOREIGN PATENT DOCUMENTS

| | | |
|---|---|---|
| EP | 1 165 736 B1 | 5/2003 |
| EP | 2 218 818 A1 | 8/2010 |
| EP | 2 218 819 A1 | 8/2010 |
| JP | 55-133424 | 10/1980 |
| JP | 59-133224 | 7/1984 |
| JP | 04-281062 | 10/1992 |
| JP | 05-016753 | 1/1993 |
| JP | 06-008779 | 1/1994 |
| JP | 11-222776 | 8/1999 |
| JP | 2001-89949 | 4/2001 |
| JP | 2001-524624 | 12/2001 |
| JP | 2004-161964 | 6/2004 |
| JP | 2004-346274 | 12/2004 |
| JP | 2006-249655 | 9/2006 |
| JP | 2007-327162 | 12/2007 |
| WO | WO 99-28121 | 6/1999 |
| WO | 2007/142214 | 12/2007 |
| WO | 2007/145324 A1 | 12/2007 |

OTHER PUBLICATIONS

Office action in U.S. Appl. No. 12/981,387, dated Nov. 28, 2011.
Office action in U.S. Appl. No. 12/981,372 , dated Nov. 29, 2011.
European Patent Office, Communication in Application No. 08874278.8 (dated Mar. 8, 2012).
U.S. Appl. No. 12/303,409, filed Dec. 4, 2008.
U.S. Appl. No. 12/746,389, filed Jun. 4, 2010.
U.S. Appl. No. 12/981,387, filed Dec. 29, 2010.
U.S. Appl. No. 12/746,384, filed Jun. 4, 2010.
U.S. Appl. No. 12/981,372, filed Dec. 29, 2010.
Communication from the USPTO in connection with U.S. Appl. No. 12/746,389 (dated Mar. 21, 2011).
Office action, dated Oct. 8, 2010, in U.S. Appl. No. 12/746,384.

* cited by examiner

*Primary Examiner* — Lynda Salvatore
(74) *Attorney, Agent, or Firm* — Fish & Richardson P.C.

(57) ABSTRACT

A copolymerized polyether polyamide resin for coating on or for impregnation to a woven or knitted fabric, wherein elongation and elastic modulus of the copolymerized polyether polyamide resin are not less than 1000% and not more than 15 MPa, respectively. The copolymerized polyether polyamide resin has a constitution wherein said copolymerized polyether polyamide resin is such that a soft segment comprising a polyether polyamide constituted from a polyether diamine compound and a dicarboxylic acid compound is bonded to a hard segment comprising a polyamide constituted from an aminocarboxylic acid compound and/or a lactam compound.

9 Claims, No Drawings

COPOLYMERIZED POLYETHER POLYAMIDE RESIN

TECHNICAL FIELD

The present invention relates to a resin which enhances slippage resistance and tear strength of a woven or knitted fabric and, more particularly, it relates to a copolymerized polyether polyamide resin for coating on or for impregnation to a woven or knitted thing whereby slippage resistance and tear strength affecting the developing property of an airbag which is one of the automobile safety parts are further enhanced as compared with those in the prior art.

BACKGROUND ART

In the use of a woven fabric, etc., there are such problems that, in the woven fabric of low cover factors, the fiber thereof is apt to be frayed resulting in its working property bad or is apt to be broken in view of its property. On the other hand, in the woven fabric of high cover factors, there is a problem that binding among the fibers becomes high resulting in low tear strength. An airbag, a wearing rate of which has been rapidly increased in recent years as one of automobile safety parts, is such that upon an automobile collision accident, a sensor senses impact, an inflator generates a gas at a high temperature and a high pressure, this gas rapidly develops an airbag, thereby, upon flying of a driver and a passenger in a collision direction, particularly a head is prevented or protected from colliding against a handle, a front glass or a door glass. Previously, in the airbag, a coated woven fabric coated with a synthetic rubber such as chloroprene, chlorosulfonated olefin and silicone has been used because of high heat resistance, high air insulating property (low air permeability), and high flame-retardancy.

However, since a woven fabric coated with these synthetic rubbers is increased in a mass of the woven fabric, is not satisfactory in flexibility, and is of the high manufacturing cost, it has many disadvantages for use in a woven fabric for an airbag. Further, slippage resistance is lower, and improvement is sought.

It has been previously known that a woven fabric is improved by changing a coating amount (see Patent Literature 1). However, there is no description in connection with airbag development performance in Patent Literature 1, and improvement is sought.
Patent Literature 1: JP-A 5-016753

On the other hand, an airbag using a non-coated woven fabric which is light, is excellent in better accommodability, and is not coated has become the mainstream (see e.g., Patent Literature 2). However, in an airbag which is of a small distance from a passenger, such as a side airbag, higher speed development performance is necessary and, for this reason, a woven fabric for an airbag withstanding a high pressure inflator is sought.
Patent Literature 2: JP-A 4-281062

Currently, as a woven fabric for an airbag which can maintain properties of a non-coated woven fabric (i.e. lightness and better accommodability) while having high slippage resistance, impregnation treatment with a synthetic resin diluent has been proposed (see e.g., Patent Literature 3). However, tear strength is not sufficiently satisfactory.
Patent Literature 3: JP-A 11-222776

To enhance both slippage resistance and tear strength, a treatment for coating a thermoplastic synthetic resin has been proposed. However, further improvement of slippage resistance and tear strength are sought (see e.g., Patent Literature 4).
Patent Literature 4: JP-A 2007-327162

DISCLOSURE OF THE INVENTION

Problems to be Solved by the Invention

An object of the present invention is to provide a resin which enhances slippage resistance and tear strength of a woven or knitted fabric and particularly to provide a copolymerized polyether polyamide resin for coating on or for impregnation to a woven or knitted fabric, which resin further enhances slippage resistance and tear strength affecting the developing property of an airbag which is one of the automobile safety parts, as compared with those in the prior art.

Means to Solve the Problems

Specifically, the present invention comprises the following features.

[1] A copolymerized polyether polyamide resin for coating on or for impregnation to a woven or knitted fabric, characterized in that, elongation and elastic modulus of the copolymerized polyether polyamide resin are not less than 1000% and not more than 15 MPa, respectively.

[2] The copolymerized polyether polyamide resin for coating on or for impregnation to a woven or knitted fabric according to [1], wherein the said copolymerized polyether polyamide resin is such that wherein a soft segment comprising a polyether polyamide constituted from a polyether diamine compound represented by the following formula [I] and a dicarboxylic acid compound represented by the following formula [II] is bonded to a hard segment comprising a polyamide constituted from an aminocarboxylic acid compound represented by the following formula [III] and/or a lactam compound represented by the following formula [IV].

[wherein R represents a linear or branched alkylene group having a carbon number of 2 to 3, and n represents a numerical value of 13 to 26]

[wherein $R^1$ represents a linking group comprising a hydrocarbon chain]

[wherein $R^2$ represents a linking group comprising a hydrocarbon chain]

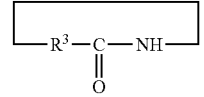

[wherein $R^3$ represents a linking group comprising a hydrocarbon chain]

[3] The copolymerized polyether polyamide resin for coating on or for impregnation to a woven or knitted fabric according to [2], wherein the polyether diamine compound of said formula [I] is a polyether diamine compound represented by the following formula [V], a number average molecular weight of said polyether diamine compound is from 700 to 1200, the soft segment is used in an amount of from 70 to 85% by mass to the total amount of said copolymerized polyether polyamide resin and a reduced viscosity of said copolymerized polyether polyamide resin is not less than 1.3.

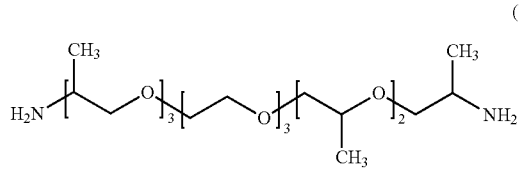

(V)

[wherein y represents a numerical value of 9.2 to 19.4, and (x+z) represents a numerical value of 3.8 to 6.0]

[4] The copolymerized polyether polyamide resin for coating on or for impregnation to a woven or knitted fabric according to [2] or [3], wherein the dicarboxylic acid compound of said formula [II] is an aliphatic dicarboxylic acid or an alicyclic dicarboxylic acid.

[5] The copolymerized polyether polyamide resin for coating on or for impregnation to a woven or knitted fabric according to any of [2] to [4], wherein $R^1$ in said formula [II] is an alkylene group having from 1 to 20 carbon atom(s).

[6] The copolymerized polyether polyamide resin for coating on or for impregnation to a woven or knitted fabric according to any of [2] to [5], wherein $R^2$ in said formula [III] is an alkylene group having from 2 to 20 carbon atom(s).

[7] The copolymerized polyether polyamide resin for coating on or for impregnation to a woven or knitted fabric according to any of [2] to [6], wherein $R^3$ in said formula [IV] is an alkylene group having from 3 to 20 carbon atom(s).

[8] A base cloth for an airbag in which the copolymerized polyether polyamide resin for coating on or for impregnation to a woven or knitted fabric according to any of [1] to [7] is used as a coating agent.

[9] A base cloth for an airbag in which the copolymerized polyether polyamide resin for coating on or for impregnation to a woven or knitted fabric according to any of [1] to [7] is used as a sealing agent.

[10] A base cloth for an airbag in which the copolymerized polyether polyamide resin for coating on or for impregnation to a woven or knitted fabric according to any of [1] to [7] is used as an adhesive agent.

Effect of the invention

The present invention can provide a resin which enhances slippage resistance and tear strength of a woven or knitted fabric and particularly can provide a copolymerized polyether polyamide resin for coating on or for impregnation to a woven or knitted fabric, which resin further enhances slippage resistance and tear strength affecting the developing property of an airbag which is one of the automobile safety parts, as compared with those in the prior art.

BEST MODE FOR CARRYING OUT THE INVENTION

It is preferred in the woven fabric where at least one side is coated with the copolymerized polyether polyamide resin of the present invention that, as a result of applying said copolymerized polyether polyamide resin, both slippage resistance and tear strength of the woven fabric are enhanced to an extent of not less than 1.8-fold. More preferably, it is not less than 1.9-fold and, still more preferably, it is not less than 2.0-fold. Although the upper limit will not be particularly restricted, it is preferably not more than 5.0-fold or, more preferably, not more than 3.0-fold when the after-process in the common base cloth such as sewing is taken into consideration. According to the known method, tear strength rises but slippage resistance lowers in the case of a resin which lowers the abrasion resistance among fibers while, in the case of a resin which rises the abrasion resistance among fibers, slippage resistance rises but tear strength lowers. Therefore, upon making into an airbag, slippage on a stitch line of the sewn part becomes big due to lowering of the slippage resistance in the case of the resin which lowers abrasion resistance and, in that part, heat exchange between the high-temperature gas generated from an inflator and the outside happens, whereby causing the burst. On the other hand, in the case of the resin which raises abrasion resistance, the tear strength is low even in the part where the slippage on a stitch line is little whereby the breakage is propagated causing the burst. In the present invention, it has been found to be able to prepare a suitable airbag resulting in no burst even under an inflator of high output when there is prepared a woven fabric where at least one side thereof is coated with the copolymerized polyether polyamide resin of the present invention, in which both slippage resistance and tear strength of the woven fabric are made not less than 1.8-fold as compared with the woven fabric before the coating, as a result of applying said copolymerized polyether polyamide resin.

It is preferred in the woven fabric where at least one side is coated with the copolymerized polyether polyamide resin of the present invention that, an air permeability under a differential pressure of 100 kPa is 1.0 L/cm²/min or less. A force of 30 to 50 kPa is exerted at development of a normal airbag, but since there is further influence by heat due to an explosive of an inflator, it is suitable to examine air permeability under a differential pressure of 100 kPa when the woven fabric is measured in the standard state. Air permeability is preferably 0.5 L/cm²/min or less, and more preferably 0.1 L/cm²/min or less. When air permeability under a differential pressure of 100 kPa is more than 1.0 L/cm²/min, the restraint property for passenger when the woven fabric is made into an airbag is not satisfactory, being not preferable. It is preferable that air permeability in JIS-L1096 is less than 0.1 cc/cm²/sec.

There will be illustrated the design of said copolymerized polyether polyamide resin for enhancing both slippage resistance and tear strength of a woven fabric for an airbag when the copolymerized polyether polyamide resin of the present invention is coated at least on one side of the woven fabric. The resin elongation of the copolymerized polyether polyamide resin of the present invention is necessary to be not less than 1000% and, particularly preferably, not less than 1500%. It is necessary that the elastic modulus of said copolymerized polyether polyamide resin is not more than 15 MPa. On the other hand, the elastic modulus is preferred to be not less than 0.01 MPa since, when the elastic modulus is less than 0.01 MPa, membrane strength lowers and, upon developing the airbag, there is a risk of a rise in permeability and of slippage on a stitch line. When resin elongation and elastic modulus of said copolymerized polyether polyamide resin are within the above ranges, both slippage resistance and tear strength of the woven fabric for airbag where said copolymerized polyether polyamide resin is applied at least on one side thereof become not less than 1.8-fold as compared with the woven fabric before coating whereby the desired properties are achieved.

As a result of making the resin elongation of the copolymerized polyether polyamide resin of the present invention not less than 1000%, air permeability under 100 kPa difference pressure of the woven fabric where said copolymerized polyether polyamide resin is coated at least on one side thereof becomes not more than 1.0 L/cm$^2$/min whereby the restraint property for passenger when airbag is prepared by coating of said copolymerized polyether polyamide resin is able to be satisfied. It is preferred that the elongation of said copolymerized polyether polyamide resin is high and, although there is no particular restriction for its upper limit, it may be not more than 10000%.

The number average molecular weight of the polyether diamine compound of the above formula [I] is preferred to be within a range of from 700 to 1200, more preferably within a range of from 800 to 1100, and further preferably within a range of from 900 to 1000. The rate of the soft segment to the total amount of the copolymerized polyether polyamide resin is preferred to be within a range of from 70 to 85% by mass, more preferably within a range of from 73 to 83% by mass, and further preferably within a range of from 77 to 81% by mass. The reduced viscosity of said copolymerized polyether polyamide resin is preferred to be not less than 1.3, more preferably not less than 1.4, and further preferably not less than 1.6. Although there is no particular restriction for the upper limit of the reduced viscosity of said copolymerized polyether polyamide resin, it is appropriate to be not more than 2.5.

As a result of the fact that the number average molecular weight of the polyether diamine compound of the above formula [I], the rate of the soft segment to the total amount of the copolymerized polyether polyamide resin and the reduced viscosity of said copolymerized polyether polyamide resin are within the above-mentioned ranges, it is now possible that both slippage resistance and tear strength of the woven fabric for an airbag where said copolymerized polyether polyamide resin is coated at least on one side thereof become not less than 1.8-fold as compared with the woven fabric before the coating whereby the desired properties are achieved.

In the present invention, a melting point of the copolymerized polyether polyamide resin of the present invention is in a range of preferably 120 to 180° C., more preferably 125 to 160 ° C., further preferably 130 to 145° C. In a woven fabric for an airbag where said copolymerized polyether polyamide resin is coated at least on one side thereof, in order to improve heat aging resistance, it is preferable that a melting point of said copolymerized polyether polyamide resin is 120° C. or higher. In addition, in order to improve solubility in water of said copolymerized polyether polyamide resin, a melting point is preferably 150° C. or lower.

In a woven fabric for an airbag where the copolymerized polyether polyamide resin of the present invention is coated at least on one side thereof, a mass after drying of the copolymerized polyether polyamide resin is preferably 0.1 to 15 g/m$^2$, more preferably 1.0 to 10 g/m$^2$, further preferably 1.0 to 5.0 g/m$^2$. The mass after drying is obtained by subtracting a value of a mass of the woven fabric before coating measured according to JIS L1096 8.4.2 from a value of a mass of the woven fabric for an airbag after coating and drying measured according to JIS L1096 8.4.2. When less than 0.1 g/m$^2$, it becomes difficult to attain air permeability, being not so preferable, and, when more than 15 g/m$^2$, flexibility is easy to get damaged, and the cost is increased, being not so preferable. In the present invention, the woven fabric before coating means a woven fabric having finished steps other than coating of a resin just at a stage before coating of a resin and, usually, shrinkage treatment by heat treatment, an heat setting etc. have been applied in many cases.

As the copolymerized polyether polyamide resin of the present invention, a copolymerized polyether polyamide resin obtained by polymerizing the polyether diamine compound of the above formula (I), the dicarboxylic acid compound of the above formula (II), and a polyamide-forming monomer, that is, the aminocarboxylic acid compound of the above formula (III) and/or the lactam compound of the above formula (IV) are preferable.

In the copolymerized polyether polyamide resin of the present invention, such a ratio is preferable that a terminal amino group, and a terminal carboxylic acid or carboxyl group contained in the polyether dianime compound, the dicarboxylic acid compound, and the polyamide-forming monomer are of approximately equal moles.

Particularly, when one terminus of the polyamide-forming monomer is an amino group, and the other terminus is carboxylic acid or a carboxyl group, such a ratio is preferable that the polyether diamine compound and the dicarboxylic acid compound are such that an amino group of the polyether diamine compound and a carboxyl group of the dicarboxylic acid are of approximately equal moles.

Examples of the polyether diamine compound of the above formula (I) include polyoxyethylene, 1,2-polyoxypropylene, 1,3-polyoxypropylene and an amino-modified copolymer thereof. In the above formula (I), R represents plural kinds of alkylene groups in some cases. And, n is a numerical value of 13 to 26.

As the polyether diamine compound of the above formula (I), a polyether diamine compound of the above formula (V) is preferable. As an embodiment of the polyether diamine compound of the above formula (V), JEFFAMINE ED900 ((x+z) is about 6.0 and y is about 12.5 in the above formula (V)) manufactured by HUNTSMAN, USA can be used.

In the polyether diamine compound of the above formula (V), y is preferably 9.2 to 19.4, more preferably 11.0 to 16.7, further preferably 12.5 to 14.4. And, (x+z) is preferably 3.8 to 6.0, more preferably 5.0 to 6.0, further preferably 5.5 to 6.0.

As the dicarboxylic acid compound of the above formula (II), at least one kind dicarboxylic acid selected from aliphatic, alicyclic and aromatic dicarboxylic acids, or a derivative thereof can be used.

In the dicarboxylic acid compound of the above formula (II), R$^1$ represents preferably a molecular chain of a hydrocarbon having a carbon number of 1 to 20, or an alkylene group having a carbon number of 1 to 20, further preferably a molecular chain of a hydrocarbon having a carbon number of 1 to 15, or an alkylene group having a carbon number of 1 to 15, more preferably a molecular chain of a hydrocarbon having a carbon number of 2 to 12, or an alkylene group having a carbon number of 2 to 12, particularly preferably a molecular chain of a hydrocarbon having a carbon number of 4 to 10, or an alkylene group having a carbon number of 4 to 10.

Examples of said dicarboxylic acid compound include aliphatic dicarboxylic acids such as linear aliphatic dicarboxylic acids such as oxalic acid, succinic acid, glutaric acid, adipic acid, pimelic acid, suberic acid, azelaic acid, sebacic acid and dodecanedioic acid, dimerized aliphatic dicarboxylic acids (dimer acid) having a carbon number of 14 to 48 obtained by dimerzing unsaturated fatty acid obtained by fractional distillation of triglyceride, and hydrogen adducts (hydrogenated dimer acid) thereof, alicyclic dicarboxylic acids such as 1,4-cyclohexanedicarboxylic acid, and aromatic dicarboxylic acids such as terephthalic acid and isophtalic acid. As the dimer acid and hydrogenated dimer acid, trade name "PRI- POL 1004", "PRIPOL 1006", "PRIPOL 1009" and "PRIPOL 1013" manufactured by Uniquema can be used.

Then, the aminocarboxylic acid compound of the above formula (III) and the lactam compound of the above formula (IV) will be explained.

In the aminocarboxylic acid compound of the above formula (III), $R^2$ represents preferably a molecular chain of a hydrocarbon having a carbon number of 2 to 20, or an alkaline group having a carbon number of 2 to 20, further preferably a molecular chain of a hydrocarbon having a carbon number of 3 to 18, or an alkylene group having a carbon number of 3 to 18, more preferably a molecular chain of a hydrocarbon having a carbon number of 4 to 15, or an alkylene group having a carbon number of 4 to 15, particularly preferably a molecular chain of a hydrocarbon having a carbon number of 4 to 10, or an alkylene group having a carbon number of 4 to 10.

In the lactam compound of the above formula (IV), $R^3$ represents preferably a molecular chain of a hydrocarbon having a carbon number of 3 to 20, or an alkylene group having a carbon number of 3 to 20, further preferably a molecular chain of a hydrocarbon having a carbon number of 3 to 18, or an alkylene group having a carbon number of 3 to 18, more preferably a molecular chain of a hydrocarbon having a carbon number of 4 to 15, or an alkylene group having a carbon number of 4 to 15, particularly preferably a molecular chain of a hydrocarbon having a carbon number of 4 to 10, or alkylene group having a carbon number of 4 to 10.

As said aminocarboxylic acid compound and said lactam compound, at least one polyamide-forming monomer including aliphatic, alicyclic and/or aromatic monomers, selected from w-aminocarboxylic acid, lactam, those synthesized from diamine and dicarboxylic acid, and salts thereof are used.

In those synthesized from diamine and dicarboxylic acid and salts thereof, examples of diamine include at least one of a diamine compound selected from aliphatic diamine, alicyclic diamine and aromatic diamine, and derivatives thereof, and examples of dicarboxylic acid include at least one kind of a dicarboxylic compound selected from aliphatic dicarboxylic acid, alicyclic dicarboxylic acid, and aromatic dicarboxilic acid, and derivatives thereof.

A molar ratio of diamine and dicarboxylic acid (diamine/dicarboxylic acid) is in a range of preferably 0.9 to 1.1, more preferably 0.93 to 1.07, further preferably 0.95 to 1.05, particularly preferably 0.97 to 1.03. When the molar ratio is outside this range, it becomes difficult to increase a molecular weight in some cases.

Examples of the ω-aminocarboxylic acid include aliphatic ω-aminocarboxylic acids having a carbon number of 5 to 20, such as 6-aminocaproic acid, 7-aminoheptanoic acid, 8-aminooctanoic acid, 10-aminocapric acid, 11-aminoundecanoic acid, and 12-aminododecanoic acid.

Examples of the lactam include aliphatic lactams having a carbon number of 5 to 20, such as ε-caprolactam, ω-enantholactam, ω-undecalactam, ω-dodecalactam, and 2-pyrrolidone.

In those synthesized form diamine and dicarboxylic acid, and salts thereof, examples of the diamine include diamine compounds such as aliphatic diamines having a carbon number of 2 to 20 such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, and 3-methylpentamethylenediamine.

Examples of the dicarboxylic acid include dicarboxylic acid compounds such as aliphatic dicarboxylic acids having a carbon number of 2 to 20 such as oxalic acid, succinic acid, glutaric acid, adipic acid, pimelic acid, suberic acid, azelaic acid, sebacic acid and dodecanedioic acid.

The copolymerized polyether polyamide resin of the present invention can be produced by the known condensation reaction.

In production of the copolymerized polyether polyamide resin of the present invention, if necessary, phosphoric acid compounds such as phosphoric acid, pyrophosphoric acid and polyphosphoric acid, phosphinic acid compounds such as dimethylphosphinic acid, phenylmethylphosphinic acid, hypophosphorous acid, sodium hypophosphite, and ethyl hypophosphite, phosphonous acid compounds such as phenylphosphonous acid, sodium phenylphosphonite, and ethyl phenylphosphonite, phosphonic acid compounds such as phenylphosphonic acid, ethylphosphonic acid, sodium phenylplosphonate, diethyl phenylphosphonate, and sodium ethylphosphonate, and phosphorous acid compounds such as phosphorous acid, sodium hydrogen phosphite, sodium phosphite, triethyl phosphite, triphenyl phosphite, and pyrophosphorous acid can be added as a catalyst.

The copolymerized polyether polyamide resin of the present invention may be compounded with various kinds of additives depending upon the object within such an extent that no characteristic feature is inhibited whereupon a composition is able to be prepared. Examples of the additive which is able to be added include known antioxidant of hindered phenol type, sulfur type, phosphorus type and amine type; light stabilizer of hindered amine type, triazole type, benzophenone type, benzoate type, nickel type and salicylic type; antistatic agent; lubricant; molecular weight adjusting agent such as peroxide; compound having reactive group such as epoxy compound, isocyanate compound or carbodiimide compound; metal inactivating agent; organic and inorganic crystal nucleus agent; neutralizing agent; antacid agent; antibacterial agent; fluorescent whitening agent; bulking agent; flame retardant; auxiliary flame retardant; heat resisting agent; ultraviolet absorber; slipping agent; tackifier; improving agent for sealing property; anticlouding agent; releasing agent; plasticizer; dye; perfume; reinforcing agent; and organic and inorganic pigments.

Examples of the antioxidant of hindered phenol type which is able to be compounded in the present invention include 3,5-di-t-butyl-4-hydroxytoluene, n-octadecyl-β-(4'-hydroxy-3',5'-di-t-butylphenyl)propionate, tetrakis[methylene-3-(3',5'-di-t-butyl-4'-hydroxyphenyl)propionate]methane, 1,3,5-trimethyl-2,4,6-tris(3,5-di-t-butyl-4-hydroxybenzyl) benzene, calcium (3,5-di-t-butyl-4-hydroxy-benzyl-monoethyl-phosphate), triethylene glycol bis[3-(3-t-butyl-5-methyl-4-hydroxyphenyl)propionate], pentaerythrityl-tetrakis[3-(3,5-di-t-butylanilino)-1,3,5-triazine, 3,9-bis[1,1-dimethyl-2-{β-(3-t-butyl-4-hydroxy-5-methylphenyl)propionyloxy}ethyl]2,4,8,10-tetraoxaspiro[5,5]undecane, bis[3,3-bis(4'-hydroxy-3'-t-butylphenyl)butyric acid]glycol ester, triphenol, 2,2'-ethylidenebis(4,6-di-t-butylphenol), N,N'-bis[3-(3,5-di-t-butyl-4-hydroxyphenyl)propionyl]hydrazine, 2,2'-oxamidebis[ethyl-3-(3,5-di-t-butyl-4-hydroxyphenyl)propionate], 1,1,3-tris(3',5'-di-t-butyl-4'-hydroxybenzyl)-S-triazine-2,4,6(1H,3H,5H)-trione, 1,3,5-tris(4-t-butyl-3-hydroxy-2,6-dimethylbenzyl)isocyanurate, 3,5-di-t-butyl-4-hydroxyhydrocinnamic acid triester with-1,3,5-tris (2-hydroxyethyl)-S-triazine-2,4,6(1H,3H,5H), N,N'-hexamethylenebis(3,5-di-t-butyl-4-hydroxyhydrocinnamide), and 3,9-bis[2-{3-(3-t-butyl-4- hydroxy-5-methylphenyl)propionyloxy}-1,1-dimethylethyl]-2,4,8,10-tetraoxaspiro[5,5]undecane.

Examples of the antioxidant of sulfur type which is able to be compounded in the present invention include dilauryl-3,3'-thiodipropionic acid ester, dimyristyl-3,3'-thiodipropionic acid ester, distearyl-3,3'-thiodipropionic acid ester, laurylstearyl-3,3'-thiodipropionic acid ester, dilaurylthiodipropionate, dioctadecyl sulfide, and pentaerythritol-tetra(β-laurylthiopropionate)ester.

Examples of the antioxidant of phosphorus type which is able to be compounded in the present invention include tris (mixed, mono and dinolylphenyl)phosphite, tris(2,3-di-t-butylphenyl)phosphite, 4,4'-butylidene-bis(3-methyl-6-t-butylphenyl-di-tridecyl)phosphite, 1,1,3-tris(2-methyl-4-ditridecylphosphite-5-t-butylphenyl)butane, tris(2,4-di-t-butylphenyl)phosphite, bis(2,4-di-t-butylphenyl)pentaerythritol-di-phosphite, tetrakis(2,4-di-t-butylphenyl)-4,4'-biphenylene phosphanite, bis(2,6-di-t-butyl-4-methylphenyl)pentaerythritol-di-phosphite, tetrakis(2,4-di-t-butylphenyl)4,4'-biphenylene-di-phosphonite, triphenyl phosphite, diphenyldecyl phosphite, tridecyl phosphite, trioctyl phosphite, tridodecyl phosphite, trioctadecyl phosphite, trinonylphenyl phosphite, and tridodecyltrithio phosphite and the like.

Examples of the antioxidant of amine type which is able to be compounded in the present invention include amines such as N,N-diphenylethylenediamine, N,N-diphenylacetamidine, N,N-diphenylformamidine, N-phenylpiperidine, dibenzylethylenediamine, triethanolamine, phenothiazine, N,N'-di-sec-butyl-p-phenylenediamine, 4,4'-tetramethyldiaminodiphenylmethane, P,P'-dioctyl-diphenylamine, N,N'-bis(1,4-dimethyl-pentyl)-p-phenylenediamine, phenyl-α-naphthylamine, phenyl-β-naphthylamine, 4,4'-bis(4-α,α-dimethylbenzyl)diphenylamine and the like, derivatives thereof, reaction products of amines and aldehydes, and reaction products of amines and ketones.

Examples of the light stabilizer of hindered amine type which is able to be compounded in the present invention include a polycondensate of dimethyl succinate and 1-(2-hydroxyethyl)-4-hydroxy-2,2,6,6-tetramethylpiperodine, poly[[6-(1,1,3,3-tetrabutyl)imino-1,3,5-triazine-2,4-diyl] hexamethylene[(2,2,6,6-tetramethyl-4-piperidyl)imyl]], bis (1,2,2,6,6-pentamethyl-4-piperidyl)ester of 2-n-butylmalonic acid, tetrakis(2,2,6,6-tetramethyl-4-piperidyl)-1,2,3,4-butanetetracarboxylate, bis(2,2,6,6-tetramethyl-4-piperidyl) sebacate, a polycondensate of N,N'-bis(2,2,6,6-tetramethyl-4-piperidyl)hexamethylenediamine and 1,2-dibromoethane, poly[(N,N'-bis(2,2,6,6-tetramethyl-4-piperidyl)hexamethylenediamine)-(4-monopholino-1,3,5-triazine-2,6-diyl)-bis(3,3,5,5-tetramethylpiperazinone)], tris(2,2,6,6-tetramethyl-4-piperidyl)-dodecyl-1,2,3,4-butanetetracarboxylate, tris(1,2,2,6,6-pentamethyl-4-piperidyl)-dodecyl-1,2,3,4-butanetetracarboxylate, bis(1,2,2,6,6-pentamethyl-4-piperidyl)sebacate, 1,6,11-tris[{4,6-bis(N-butyl-N-(1,2,2,6,6-pentamethylpiperidin-4-yl)amino-1,3,5-triazin-2-yl)amino}undecane, 1-[2-(3,5-di-t-butyl-4-hydroxyphenyl) propionyloxy]-2,2,6,6-tetramethylpiperidine, 8-benzyl-7,7,9,9-tetramethyl-3-octyl-1,3,8-triazaspiro[4,5]undecane-2,4-dione, 4-benzoyloxy-2,2,6,6-tetramethylpiperidine, and a condensate of N,N'-bis(3-aminopropyl)ethylenediamine-2,4-bis[N-butyl-N-(1,2,2,6,6-pentamethyl-4-piperidyl) amino]-6-chloro-1,3,5-triazine.

Examples of the light stabilizer of benzophenone type, benzotriazole type, triazole type, nickel type, or salicyl type which is able to be compounded in the present invention include 2,2'-dihydroxy-4-methoxybenzophenone, 2-hydroxy-4-n-octoxybenzophenone, p-t-butylphenylsalicylate, 2,4-di-t-butylphenyl-3,5-di-t-butyl-4-hydroxy benzoate, 2-(2'-hydroxy-5'-methylphenyl)benzotriazole, 2-(2'-hydroxy-3',5'-di-t-amyl-phenyl)benzotriazole, 2-[2'-hydroxy-3',5'-bis(α,α-dimethylbenzylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2,5-bis[5'-t-butylbenzoxazolyl-(2)]-thiophene, bis(3,5-di-t-butyl-4-hydroxybenzylphosphoric acid monoethyl ester) nickel salt, a mixture of 2-ethoxy-5-t-butyl-2'-ethyloxalic acid-bis-anilide; 85-90% and 2-ethoxy-5-t-butyl-2'-ethyl-4'-t-butyloxalic acid-bis-anilide; 10-15%, 2-[2-hydroxy-3,5-bis (α,α-dimethylbenzyl)phenyl]-2H-benzotriazole, 2-ethoxy-2'-ethyloxalic acid bisanilide, 2-[2'-hydroxy-5'-methyl-3'-(3",4",5",6"-tetrahydrophthalimido-methyl)phenyl] benzotriazole, bis(5-benzoyl-4-hydroxy-2-methoxyphenyl) methane, 2-(2'-hydroxy-5'-t-octylphenyl)benzotriazole, 2-hydroxy-4-i-octoxybenzophenone, 2-hydroxy-4-dodecyloxybenzophenone, 2-hydroxy-4-octadecyloxybenzophenone, and phenyl salicylate.

Examples of the lubricant which is able to be compounded in the present invention include the compounds of hydrocarbon type, fatty acid type, fatty acid amide type, ester type, alcohol type, metal soap type, natural wax type, silicone type and fluorine type. Specific examples of the lubricant include liquid paraffin; synthetic paraffin; synthetic hard paraffin; synthetic isoparaffin petroleum hydrocarbon; chlorinated paraffin; paraffin wax; microwax; lowly polymerized polyethylene; flurocarbon oil; fatty acid compound having a carbon number of 12 or more such as lauric acid, myristic acid, palmitic acid, stearic acid, arachidic acid or behenic acid; saturated or unsaturated aliphatic amide having a carbon number of 3 to 30 or derivatives thereof such as hexylamide, octylamide, stearylamide, palmitylamide, oleylamide, erucylamide, ethylenebisstearylamide, laurylamide, behenylamide, methylenebisstearylamide or licinolamide; lower alcohol ester of fatty acid; polyhydric alcohol ester of fatty acid; polyglycol ester of fatty acid; aliphatic alcohol ester of fatty acid such as butyl stearate, hydrogenated castor oil or ethylene glycol monostearate; cetyl alcohol; stearyl alcohol; ethylene glycol; polyethylene glycol having a molecular weight of from 200 to even more than 10000; polyglycerol; carnauba wax; candelila wax, montan wax; dimethyl silicone; silicon rubber; and ethylene tetrafluoride. Another examples include metal soap which is a metal salt comprising a compound having linear-chain saturated fatty acid, side-chain acid or sinolic acid where metal is selected from Li, Mg, Ca, Sr, Ba, Zn, Cd, Al, Sn and Pb.

Examples of the bulking agent which is able to be compounded in the present invention include oxide such as magnesium oxide, aluminum oxide, silicon oxide, calcium oxide, titanium oxide (rutile type and anatase type), chromium (trivalent) oxide, iron oxide, zinc oxide, silica, diatomaceous earth, alumina fiber, antimony oxide, barium ferrite, strontium ferrite, beryllium oxide, pumice stone or pumice stone balloon; basic substance or hydroxide such as magnesium hydroxide, aluminum hydroxide or magnesium basic carbonate; carbonate such as magnesium carbonate, calcium carbonate, barium carbonate, ammonium carbonate, calcium sulfite, dolomite or dawsonite; sulfate or sulfite such as calcium sulfate, barium sulfate, ammonium sulfate, calcium sulfite or magnesium basic sulfate; silicate such as sodium silicate, magnesium silicate, aluminum silicate, potassium silicate, calcium silicate, talc, clay, mica, asbestos, glass fiber, montmorillonite, glass balloon, glass beads or bentonite; kaolin; pearlite; iron powder; copper powder; lead powder; aluminum powder; tungsten powder; molybdenum sulfide; carbon black; boron fiber; silicon carbide fiber; brass fiber;

potassium titanate; lead titanate zirconate; zinc borate; aluminum borate; barium metaborate; calcium borate; and sodium borate.

Examples of the auxiliary flame retardant which is able to be compounded in the present invention include antimony dioxide, antimony tetraoxide, antimony pentaoxide, sodium pyroantimonate, tin dioxide, zinc metaborate, aluminum hydroxide, magnesium hydroxide, zirconium oxide, molybdenum oxide, red phosphorus compound, ammonium polyphosphate, melamine cyanurate and ethylene tetrafluoride.

Examples of the compound having a triazine group and/or derivatives thereof which are/is able to be compounded in the present invention include melamine, melamine cyanurate, melamine phosphate and guanidine sulfamate.

Examples of the inorganic phosphorus compound of the phosphorus compound which is able to be compounded in the present invention include red phosphorus compound and ammonium polyphosphate. Examples of the red phosphorus compound include a product where resin is coated on red phosphorus and a complex compound with aluminum. Examples of the organic phosphorus compound include phosphate and melamine phosphate. With regard to the phosphate, the followings are preferred in view of resistance to hydrolysis, thermostability and incombustibility. They are phosphate, phosphonate and phosphinate such as trimethyl phosphate, triethyl phosphate, tributyl phosphate, trioctyl phosphate, trioctyl phosphinate, tributoxy ethyl phosphate, octyl diphenyl phosphate, tricresyl phosphate, cresyl diphenyl phosphate, triphenyl phosphate, trixylenyl phosphate, tris-isopropoylphenyl phosphate, diethyl-N,N-bis(2-hydroxyethyl)aminomethyl phosphonate and bis(1,3-phenylenediphenyl)phosphate; and aromatic condensed phosphate such as 1,3-[bis(2,6-dimethylphenoxy)phosphenyloxy]benzene and 1,4-[bis(2,6-dimethylphenoxy)phosphenyloxy]benzene.

The synthetic fiber forming a woven fabric on which the copolymerized polyether polyamide resin is to be coated in the present invention is not particularly limited in a material, but aliphatic polyamide fibers such as nylon 66, nylon 6, nylon 46, and nylon 12, aromatic polyamide fibers such as an aramide fiber, and polyester fibers such as polyethylene terephthalate, polytrimethylene terephthalate and polybutylene terephthalate are used particularly. Others include wholly aromatic polyester fibers, ultrahigh molecular weight polyethylene fibers, polyparaphenylene/benzobisoxazole fibers (PBO fiber), polyphenylene sulfide fibers, and polyether ketone fibers. In view of economy, polyester fibers and polyamide fibers are particularly preferable.

As these fibers, a part or all of them may be obtained from a used raw material. In addition, it is not problematic at all that these synthetic fibers contain various additives in order to improve step passage property at an original yarn production step and a post-possessing step. Examples of additives include antioxidants, thermal stabilizers, smoothing agents, antistatic agents, viscosity-increasing agents, and flame-retardants. In addition, it is not problematic at all that these synthetic fibers are a colored original yarn, or are dyed after yarn-making. In addition, a cross section of a single yarn may be of a modified cross-section in addition to a conventional circular cross section without any problem. It is preferable that the synthetic fiber is used as a multifilament yarn and woven into a fabric from a viewpoint of a breakage strength, a breakage elongation or the like.

In the present invention, a method of weaving a fabric on which the copolymerized polyether polyamide resin is to be coated is not particularly limited, but plain weaving is good in view of uniformity of physical property of a woven fabric. As a yarn, a warp and a weft may not be of single kind, and may be different, for example, in a thickness, the number, and a fiber kind of yarns. Considering the recycling property, the kind of the polymer is preferably one. The weaving machine to be used is not particularly limited, and air jet loom, Rapier loom, and water jet loom etc. can be used. The cover factor of the woven fabric shown in the following formula is preferably 1500-2500. When the cover factor is less than 1500, the air permeability increases and the slippage on a stitch line in the sewn part of the airbag increases, which are not preferable. When the cover factor is more than 2500, the stiffness increases and the accommodating property deteriorates, which are not preferable. More preferably, the cover factor is 1800-2300.

Cover factor=(warp fineness(dtex)×0.9)$^{1/2}$×warp density (number/2.54 cm)+(weft fineness(dtex)×0.9)$^{1/2}$×weft density (number/2.54 cm)

The coating method of the copolymerized polyether polyamide resin of the present invention is not particularly limited, but the known method can be used and, in view of the cost and flexibility of the woven fabric after coating, it is preferable to use knife coating.

Since the copolymerized polyether polyamide resin in the present invention has a high adhesive force to the base cloth for an airbag and also has a high elongation, it is able to be used as a seam stopper (sealing agent) for the part where the base cloth for airbag is layered and sewn for forming a bag, and as an adhesive.

EXAMPLES

As hereunder, the present invention will now be more specifically illustrated by way of Examples and Comparative Examples although the present invention is not limited to those Examples. The characteristic properties shown in Examples and Comparative Examples were measured by the following methods.

1. Reduced Viscosity ($\eta sp/c$)

The copolymerized polyether polyamide resin (about 0.05 g) was dissolved in 25 mL of a mixed solvent of phenol and tetrachloroethane (ratio by weight: 6/4) and the resulting sample solution was subjected to the measurement using an Ostwald viscometer at 30° C.

2. Terminal Amino Group Concentration ([$NH_2$]; Unit is eq/Ton)

The copolymerized polyether polyamide resin (about 0.6 g) was dissolved in 50 mL of a mixed solvent of phenol and tetrachloroethane (ratio by volume: 4/1), 20 mL of a mixed solvent of distilled water and ethanol (ratio by volume: 3/2) was added thereto, then Methyl Orange was added to the resulting sample solution as an indicator and titration was conducted with N/10 hydrochloric acid.

3. Terminal Carboxyl Group Concentration ([COOH]; Unit is eg/Ton)

The copolymerized polyether polyamide resin (about 0.2 g) was dissolved in 10 mL of benzyl alcohol under heating, 10 mL of chloroform was added thereto, phenolphthalein was added as an indicator to the resulting sample solution and titration was conducted using N/25 ethanolic solution of potassium hydroxide-ethanol.

4. Number Average Molecular Weight (Mn)

The number average molecular weight (Mn) was determined by the following formula using the terminal amino group concentration ([NH$_2$]) and the terminal carboxyl group concentration ([COOH]).

$$\text{Number average molecular weight (Mn)} = 2 \times 1000000/\text{(Terminal amino group concentration [NH}_2] + \text{Terminal carboxyl group concentration [COON])}$$

5. Melting Point (Tm) and Glass Transition Temperature (Tg)

Tm and Tg were measured under a nitrogen atmosphere using a differential scanning calorimeter DSC-Q100 manufactured by T. A. Instrument Japan KK. Temperature was raised from room temperature to 220° C. at the rate of 10° C. per minute (called "rising temperature first run"), kept at 220° C. for 3 minutes, lowered down to −80° C. at the rate of 10° C. per minute (called "lowering temperature first run"), and then raised up to 220° C. at the rate of 10° C. per minute (called "rising temperature second run"). The endothermic peak temperature of the rising temperature second run of the resulting DSC chart was adopted as Tm and Tg was also calculated from the glass transition point.

6. Composition

The copolymerized polyether polyamide resin (15 mg) was dissolved in heavy formic acid and composition of each component was determined from the proton NMR spectrum measured at room temperature using an Avance 500 Fourier transform nuclear magnetic resonance device manufactured by Bruker.

7. Resin Elongation

The copolymerized polyether polyamide resin was made into an aqueous resin containing 20% of solid, the resulting aqueous resin was flown into a frame made of Teflon (registered trade mark) sheet and subjected to natural drying for two days to give a film in uniform thickness of about 1 mm. The resulting film was cut into a rectangular shape (10 mm width and about 50 mm length) and subjected to a tensile test using a tensile tester where chuck distance was 10 mm and tensile rate was 10 mm per minute and the elongation upon breaking was measured.

8. Resin Elastic Modulus (Young's Modulus)

The copolymerized polyether polyamide resin was made into an aqueous resin containing 20% of solid, the resulting aqueous resin was flown into a frame made of Teflon (registered trade mark) sheet and subjected to natural drying for two days to give a film in uniform thickness of about 1 mm. The resulting film was cut into a rectangular shape (10 mm width and about 50 mm length) and subjected to a tensile test using a tensile tester where chuck distance was 10 mm and tensile rate was 10 mm per minute and elastic modulus (Young's modulus) was measured.

9. Air Permeability

Air permeability under a pressure of 100 kPa was measured using a high pressure air permeability measuring machine (manufactured by OEM System).

10. Rising Rate of Slippage Resistance

Measurement was conducted according to ASTM D 6479.

The slippage resistance was determined by the following formula.

$$\text{Rising rate of slippage resistance (fold)} = [(\text{slippage resistance after coating in warp}) + (\text{slippage resistance after coating in weft})] \div [(\text{slippage resistance before coating in warp}) + (\text{slippage resistance before coating in weft})]$$

11. Rising Rate of Tear Strength

Measurement was conducted in accordance with 8.15.2 Median Load of JIS L 1096.

Rising rate of tear strength was determined by the following formula.

$$\text{Rising rate of tear strength (fold)} = [(\text{tear strength after coating in warp}) + (\text{tear strength after coating in weft})] \div [(\text{tear strength before coating in warp}) + (\text{tear strength before coating in weft})]$$

Example 1

Polyether diamine (Jeffamine ED 900 manufactured by Huntsman; total amine: 2.16 meq/g) (1005.45 g), 158.68 g of adipic acid (AA), 375.00 g of ε-caprolactam (ε-CL) and 22.5 mL of aqueous solution of phosphoric acid (63.2 g/L) were charged into a reactor having about 5-liter volume equipped with stirrer, temperature controller, pressure gauge, inlet for introduction of nitrogen gas, drain outlet for condensed water, and pressure adjusting device, the inner area of the reactor was well substituted with nitrogen, temperature was raised up to 230° C. during 0.5 hour and polymerization was conducted at 230° C. for 4.0 hours. After that, polymerization was continued for 1.5 hours under a reduced pressure to give a polymer. Then the inner area of the reactor was depressurized using a pressure adjusting device for 1.0 hour while the temperature was still maintained at 230° C. and then polymerization was further conducted at 230° C. for 0.5 hour to give a polymer. The resulting polymer was in light yellow color and well stretching and had rubber elastic property. Characteristic property of the resulting polymer was evaluated and mentioned in Table 1.

Example 2

Polyether diamine (Jeffamine ED 900 manufactured by Huntsman; total amine: 2.16 meq/g) (134.06 g), 21.16 g of adipic acid (AA), 57.96 g of 6-aminohexanoic acid (6-AHA) and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 8.5 hours to give a polymer. The resulting polymer was in light yellow color and well stretching and had rubber elastic property. Characteristic property of the resulting polymer was evaluated and mentioned in Table 1.

Example 3

Polyether diamine (Jeffamine ED 600 manufactured by Huntsman; total amine: 3.21 meq/g) (101.89 g), polyether diamine (Jeffamine ED 900 manufactured by Huntsman; total amine: 2.16 meq/g) (32.17 g), 28.98 g of adipic acid (AA), 50.00 g of ε-caprolactam (ε-CL), and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 8.0 hours to give a polymer. The resulting polymer was in light yellow color and well stretching and had rubber elastic property. Characteristic property of the resulting polymer was evaluated and mentioned in Table 1.

Example 4

Polyether diamine (Jeffamine ED 900 manufactured by Huntsman; total amine: 2.16 meq/g) (116.36 g), polyether diamine (Jeffamine ED 2003 manufactured by Huntsman; total amine: 1.00 meq/g) (8.76 g), 19.00 g of adipic acid (AA), 60.00 g of ε-caprolactam (ε-CL), and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 8.5 hours to give a polymer. The resulting polymer was in light yellow color and well stretching and had rubber elastic property. Characteristic property of the resulting polymer was evaluated and mentioned in Table 1.

Example 5

Polyether diamine (Jeffamine ED 900 manufactured by Huntsman; total amine: 2.16 meq/g) (112.61 g), polyether diamine (Jeffamine ED 2003 manufactured by Huntsman; total amine: 1.00 meq/g) (21.45 g), 19.34 g of adipic acid (AA), 50.00 g of ε-caprolactam (ε-CL), and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 8.0 hours to give a polymer. The resulting polymer was in light yellow color and well stretching and had rubber elastic property. Characteristic property of the resulting polymer was evaluated and mentioned in Table 1.

Example 6

Polyether diamine (Jeffamine ED 900 manufactured by Huntsman; total amine: 2.16 meq/g) (85.98 g), polyether diamine (Jeffamine ED 2003 manufactured by Huntsman; total amine: 1.00 meq/g) (30.21 g), 15.78 g of adipic acid (AA), 70.00 g of ε-caprolactam (ε-CL), and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 9.0 hours to give a polymer. The resulting polymer was in light yellow color and well stretching and had rubber elastic property. Characteristic property of the resulting polymer was evaluated and mentioned in Table 1.

Example 7

Polyether diamine (Jeffamine ED 900 manufactured by Huntsman; total amine: 2.16 meq/g) (104.50 g), polyether diamine (Jeffamine ED 2003 manufactured by Huntsman; total amine: 1.00 meq/g) (36.71 g), 19.17 g of adipic acid (AA), 42.00 g of ε-caprolactam (ε-CL), and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 9.0 hours to give a polymer. The resulting polymer was in light yellow color and well stretching and had rubber elastic property. Characteristic property of the resulting polymer was evaluated and mentioned in Table 1.

Example 8

Polyether diamine (Jeffamine ED 900 manufactured by Huntsman; total amine: 2.16 meq/g) (134.06 g), 21.16 g of adipic acid (AA), 57.96 g of 6-aminohexanoic acid (6-AHA), 0.4 g of antioxidant of a hindered phenol type (triethylene glycol bis[3-(3-t-butyl-5-methyl-4-hydroxyphenyl)propionate] manufactured by CIBA Specialty Chemicals; Irganox 245) and 3 mL of aqueous solution of phosphoric acid (63.2 g/L) were charged into a reactor having about 500 mL volume equipped with stirrer, temperature controller, pressure gauge, inlet for introduction of nitrogen gas, drain outlet for condensed water, and pressure adjusting device, the inner area of the reactor was well substituted with nitrogen, temperature was raised up to 230° C. during 0.5 hour together with supplying nitrogen gas thereto at the flow rate of 150 mL per minute and the polymerization was conducted at 230° C. for 2.5 hours. After that, supplying of nitrogen gas was stopped while the temperature was still maintained at 230° C., the inner area of the reactor was depressurized using a vacuum pump for 1.0 hour and the polymerization was further conducted at 230° C. for 1.0 hour to give a polymer. The resulting polymer was in light yellow color and well stretching and had rubber elastic property. Characteristic property of the resulting polymer was evaluated and mentioned in Table 1.

Example 9

Polyether diamine (Jeffamine ED 900 manufactured by Huntsman; total amine: 2.16 meq/g) (134.06 g), 21.16 g of adipic acid (AA), 57.96 g of 6-aminohexanoic acid (6-AHA), 0.4 g of antioxidant of a hindered phenol type (pentaerythrityl-tetrakis[3-(3,5-di-t-4-hydroxyphenyl)propionate] manufactured by CIBA Specialty Chemicals; Irganox 1010) and 3 mL of aqueous solution of phosphoric acid (63.2 g/L) were charged into a reactor having about 500 mL volume equipped with stirrer, temperature controller, pressure gauge, inlet for introduction of nitrogen gas, drain outlet for condensed water, and pressure adjusting device, the inner area of the reactor was well substituted with nitrogen, temperature was raised up to 230° C. during 0.5 hour together with supplying nitrogen gas thereto at the flow rate of 150 mL per minute and the polymerization was conducted at 230° C. for 2.5 hours. After that, supplying of nitrogen gas was stopped while the temperature was still maintained at 230° C., the inner area of the reactor was depressurized using a vacuum pump for 1.0 hour and the polymerization was further conducted at 230° C. for 1.0 hour to give a polymer. The resulting polymer was in light yellow color and well stretching and had rubber elastic property. Characteristic property of the resulting polymer was evaluated and mentioned in Table 1.

Example 10

Polyether diamine (Jeffamine ED 900 manufactured by Huntsman; total amine: 2.16 meq/g) (134.06 g), 21.16 g of adipic acid (AA), 57.96 g of 6-aminohexanoic acid (6-AHA), 0.4 g of antioxidant of a hindered phenol type (N-N'-hexamethylenebis (3,5-di-t-butyl-4-hydroxy-hydrocinnamamide) manufactured by CIBA Specialty Chemicals; Irganox 1098) and 3 mL of aqueous solution of phosphoric acid (63.2 g/L) were charged into a reactor having about 500 mL volume equipped with stirrer, temperature controller, pressure gauge, inlet for introduction of nitrogen gas, drain outlet for condensed water, and pressure adjusting device, the inner area of the reactor was well substituted with nitrogen, temperature was raised up to 230° C. during 0.5 hour together with supplying nitrogen gas thereto at the flow rate of 150 mL per minute and the polymerization was conducted at 230° C. for 2.5 hours. After that, supplying of nitrogen gas was stopped while the temperature was still maintained at 230° C., the inner area of the reactor was depressurized using a vacuum pump for 1.0 hour and the polymerization was further conducted at 230° C. for 1.0 hour to give a polymer. The resulting polymer was in light yellow color and well stretching and had rubber elastic property. Characteristic property of the resulting polymer was evaluated and mentioned in Table 1.

Example 11

Polyether diamine (Jeffamine ED 900 manufactured by Huntsman; total amine: 2.16 meq/g) (134.06 g), 21.16 g of adipic acid (AA), 57.96 g of 6-aminohexanoic acid (6-AHA), 0.4 g of antioxidant of a hindered phenol type (1,3,5-trimethyl-2,4,6-tris(3,5-di-t-butyl-4-hydroxybenzyl)benzene) manufactured by CIBA Specialty Chemicals; Irganox 1330) and 3 mL of aqueous solution of phosphoric acid (63.2 g/L) were charged into a reactor having about 500 mL volume equipped with stirrer, temperature controller, pressure gauge, inlet for introduction of nitrogen gas, drain outlet for condensed water, and pressure adjusting device, the inner area of the reactor was well substituted with nitrogen, temperature was raised up to 230° C. during 0.5 hour together with supplying nitrogen gas thereto at the flow rate of 150 mL per minute and the polymerization was conducted at 230° C. for 2.5 hours. After that, supplying of nitrogen gas was stopped while the temperature was still maintained at 230° C., the inner area of the reactor was depressurized using a vacuum pump for 1.0 hour and the polymerization was further conducted at 230° C. for 1.0 hour to give a polymer. The resulting polymer was in light yellow color and well stretching and had rubber elastic property. Characteristic property of the resulting polymer was evaluated and mentioned in Table 1.

Examples 12 to 22

Each of the polymers prepared in Examples 1 to 11 was subjected to Examples 12 to 22, respectively. Each polymer from Examples 1 to 11 was made into an aqueous resin containing 20% of solid and 1% by weight of carboxymethyl cellulose was added to said aqueous resin so as to adjust the viscosity to 25 dPa·s (measured by a Viscotester VT-04F manufactured by Rion KK). In the meanwhile, Polyamide 66 fiber of 108 filaments where total fineness was 400 dtex was woven using a water jet loom in plain weaving, subjected to a shrinking process using boiling water and dried at 110° C. to give woven fabric where warp density was 63 warps per 2.54 cm and weft density was 61 wefts per 2.54 cm. The above-prepared aqueous resin was coated on the woven fabric using a knife coat and the characteristic property of the woven fabric where resin amount after drying was made 4 g per m² was evaluated and shown in Table 2.

Comparative Example 1

Polyether diamine (Jeffamine ED 600 manufactured by Huntsman; total amine: 3.21 meq/g) (110.48 g), 25.91 g of adipic acid (AA), 81.15 g of 6-aminohexanoic acid (6-AHA), and 3 mL of aqueous solution of phosphoric acid (63.2 g/L) were charged into a reactor having about 500 mL volume equipped with stirrer, temperature controller, pressure gauge, inlet for introduction of nitrogen gas, drain outlet for condensed water, and pressure adjusting device, the inner area of the reactor was well substituted with nitrogen, temperature was raised up to 230° C. during 0.5 hour together with supplying nitrogen gas thereto at the flow rate of 150 mL per minute and the polymerization was conducted at 230° C. for 4.5 hours. After that, supplying of nitrogen gas was stopped while the temperature was still maintained at 230° C., the inner area of the reactor was depressurized using a vacuum pump for 0.5 hour and the polymerization was further conducted at 230° C. for 2 hours to give a polymer. The resulting polymer was in light yellow color and could be stretched to some extent and had rubber elastic property. Characteristic property of the resulting polymer was evaluated and mentioned in Table 3.

Comparative Example 2

Polyether diamine (Jeffamine ED 900 manufactured by Huntsman; total amine: 2.16 meq/g) (107.25 g), 16.93 g of adipic acid (AA), 92.74 g of 6-aminohexanoic acid (6-AHA) and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 9.0 hours to give a polymer. The resulting polymer was in light yellow color and well stretching and had rubber elastic property. Characteristic property of the resulting polymer was evaluated and mentioned in Table 3.

Comparative Example 3

Polyether diamine (Jeffamine ED 900 manufactured by Huntsman; total amine: 2.16 meq/g) (125.12 g), 19.75 g of adipic acid (AA), 69.56 g of 6-aminohexanoic acid (6-AHA) and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 3.0 hours to give a polymer. The resulting polymer was in light yellow color and well stretching and had rubber elastic property. Characteristic property of the resulting polymer was evaluated and mentioned in Table 3.

Comparative Example 4

Polyether diamine (Jeffamine ED 900 manufactured by Huntsman; total amine: 2.16 meq/g) (141.30 g), polyether diamine (Jeffamine ED 2003 manufactured by Huntsman; total amine: 1.00 meq/g) (10.64 g), 23.08 g of adipic acid (AA), 30.00 g of ε-caprolactam (ε-CL), and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 8.0 hours to give a polymer. The resulting polymer had rubber elastic property. Characteristic property of the resulting polymer was evaluated and mentioned in Table 3.

Comparative Example 5

Polyether diamine (Jeffamine ED 900 manufactured by Huntsman; total amine: 2.16 meq/g) (93.84 g), polyether diamine (Jeffamine ED 2003 manufactured by Huntsman; total amine: 1.00 meq/g) (40.22 g), 17.75 g of adipic acid (AA), 50.00 g of ε-caprolactam (ε-CL), and 3 mL of aqueous solution of phosphoric acid (63.2 g/L) were charged into a reactor having about 500 mL volume equipped with stirrer, temperature controller, inlet for introduction of nitrogen gas, and drain outlet for condensed water, the inner area of the reactor was well substituted with nitrogen, temperature was raised up to 230° C. during 0.5 hour together with supplying nitrogen gas thereto at the flow rate of 150 mL per minute, and polymerization was conducted at 230° C. for 8.0 hours to give a polymer. The resulting polymer was in light yellow color and well stretching and had rubber elastic property. However, the polymer showed double peaks of melting point and showed a tendency of phase separation. Therefore, the evaluation thereafter was stopped. Characteristic property of the resulting polymer was evaluated and mentioned in Table 3.

Comparative Examples 6 to 9

Each of the polymers prepared in Comparative Examples 1 to 4 was subjected to Comparative Examples 6 to 9, respectively. Each polymer from Comparative Examples 1 to 4 was made into an aqueous resin containing 20% of solid and 1% by weight of carboxymethyl cellulose was added to said aqueous resin so as to adjust the viscosity to 25 dPa·s (measured by a Viscotester VT-04F manufactured by Rion KK). In the meanwhile, Polyamide 66 fiber of 108 filaments where total fineness was 400 dtex was woven using a water jet loom in plain weaving, subjected to a shrinking process using boiling water and dried at 110° C. to give woven fabric where warp density was 58 warps per 2.54 cm and weft density was 56 wefts per 2.54 cm. The above-prepared aqueous resin was coated on the woven fabric using a knife coat and the characteristic property of the woven fabric where resin amount after drying was made 4 g per m² was evaluated and shown in Table 4.

TABLE 1

|  | Unit | Example 1 | Example 2 | Example 3 | Example 4 | Example 5 |
|---|---|---|---|---|---|---|
| Polyether diamine molecular weight |  | 900 | 900 | 700 | 1000 | 1100 |
| Soft segment rate | % by mass | 80.0 | 79.3 | 79.5 | 74.8 | 79.7 |
| ηsp/c | dl/g | 1.61 | 1.62 | 1.38 | 1.65 | 1.71 |
| [NH$_2$] | eq/ton | 19 | 17 | 21 | 18 | 16 |
| [COOH] | eq/ton | 29 | 37 | 27 | 43 | 39 |
| Mn |  | 42000 | 37000 | 42000 | 33000 | 36000 |
| Tm | ° C. | 126 | 126 | 114 | 153 | 142 |
| Tg | ° C. | −45 | −46 | −38 | −46 | −49 |
| Elongation | % | 1600 | 3500 | 1100 | 3200 | 2800 |
| Elastic modulus | MPa | 10 | 10 | 12 | 15 | 9 |

|  | Example 6 | Example 7 | Example 8 | Example 9 | Example 10 | Example 11 |
|---|---|---|---|---|---|---|
| Polyether diamine molecular weight | 1200 | 1200 | 900 | 900 | 900 | 900 |
| Soft segment rate | 70.3 | 84.6 | 80.5 | 79.3 | 79.1 | 79.6 |
| ηsp/c | 1.92 | 1.72 | 1.67 | 1.82 | 1.73 | 1.74 |
| [NH$_2$] | 11 | 11 | 3 | 13 | 0 | 8 |
| [COOH] | 32 | 38 | 67 | 34 | 65 | 37 |
| Mn | 47000 | 41000 | 29000 | 43000 | 31000 | 44000 |
| Tm | 182 | 133 | 122 | 127 | 128 | 126 |
| Tg | −50 | −51 | −46 | −45 | −47 | −46 |
| Elongation | 2600 | 3300 | 3300 | 3900 | 3500 | 3700 |
| Elastic modulus | 12 | 8 | 9 | 10 | 10 | 10 |

TABLE 2

|  |  | Unit | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|---|
| Total fineness |  | dtex | 400 | 400 | 400 | 400 | 400 | 400 | 400 | 400 | 400 | 400 | 400 |
| Number of filaments |  | — | 108 | 108 | 108 | 108 | 108 | 108 | 108 | 108 | 108 | 108 | 108 |
| Density | Warp | Warp/2.54 cm | 58 | 58 | 58 | 58 | 58 | 58 | 58 | 58 | 58 | 58 | 58 |
|  | Weft | Weft/2.54 cm | 56 | 56 | 56 | 56 | 56 | 56 | 56 | 56 | 56 | 56 | 56 |
| Resin amount |  | g/m² | 4 | 4 | 4 | 4 | 4 | 4 | 4 | 4 | 4 | 4 | 4 |
| Air permeability at 100 kPa |  | L/cm²/min | 0.16 | 0.08 | 0.15 | 0.06 | 0.08 | 0.08 | 0.10 | 0.09 | 0.06 | 0.08 | 0.08 |

TABLE 2-continued

|  | Unit | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| Increase rate of slippage resistance | Time | 1.86 | 2.05 | 1.85 | 2.18 | 1.92 | 2.14 | 1.88 | 1.90 | 2.11 | 2.01 | 2.05 |
| Increase rate of tear strength | Time | 1.91 | 1.96 | 1.89 | 1.87 | 2.00 | 1.82 | 2.23 | 2.01 | 1.98 | 1.96 | 1.98 |

TABLE 3

|  | Unit | Comparative Example 1 | Comparative Example 2 | Comparative Example 3 | Comparative Example 4 | Comparative Example 5 |
|---|---|---|---|---|---|---|
| Polyether diamine molecular weight |  | 600 | 900 | 900 | 1000 | 1250 |
| Soft segment rate | % by mass | 70.1 | 65.0 | 79.9 | 89.9 | 79.8 |
| ηsp/c | dl/g | 1.35 | 1.90 | 1.22 | 1.61 | 1.67 |
| [NH$_2$] | eq/ton | 21 | 18 | 35 | 17 | 14 |
| [COOH] | eq/ton | 35 | 31 | 71 | 40 | 39 |
| Mn |  | 36000 | 41000 | 19000 | 35000 | 38000 |
| Tm | °C. | 137 | 173 | 146 | 90 | 18/126 |
| Tg | °C. | −29 | −46 | −47 | −49 | −51 |
| Elongation | % | 900 | 2100 | 2400 | 460 | — |
| Elastic modulus | MPa | 24 | 31 | 27 | 9 | — |

TABLE 4

|  | Unit | Comparative Example 6 | Comparative Example 7 | Comparative Example 8 | Comparative Example 9 |
|---|---|---|---|---|---|
| Total fineness | dtex | 400 | 400 | 400 | 400 |
| Number of filaments | — | 108 | 108 | 108 | 108 |
| Density Warp | Warp/2.54 cm | 58 | 58 | 58 | 58 |
| Weft | Weft/2.54 cm | 56 | 56 | 56 | 56 |
| Resin amount | g/m$^2$ | 4 | 4 | 4 | 4 |
| Air permeability at 100 kPa | L/cm$^2$/min | 0.07 | 0.06 | 0.09 | 0.22 |
| Increase rate of slippage resistance | Time | 2.31 | 2.30 | 1.67 | 1.20 |
| Increase rate of tear strength | Time | 1.41 | 1.30 | 1.35 | 2.18 |

INDUSTRIAL APPLICABILITY

The copolymerized polyether polyamide resin for coating on or for impregnation to a woven or knitted fabric of the present invention can further enhance slippage resistance and tear strength affecting the developing property of an airbag as compared with those in the prior art, and can be utilized for an airbag which is one of the automobile safety parts, whereby considerably contributes to the industrial field.

The invention claimed is:

1. A copolymerized polyether polyamide resin for coating on or for impregnation to a woven or knitted fabric wherein elongation and elastic modulus of the copolymerized polyether polyamide resin are not less than 1000% and not more than 15 MPa, respectively, and wherein said copolymerized polyether polyamide resin is such that wherein a soft segment comprising a polyether polyamide constituted from a polyether diamine compound represented by the following formula [I] and a dicarboxylic acid compound represented by the following formula [II] is bonded to a hard segment comprising a polyamide constituted from an aminocarboxylic acid compound represented by the following formula [III] and/or a lactam compound represented by the following formula [IV]

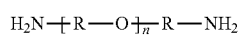
(I)

[wherein R represents a linear or branched alkylene group having a carbon number of 2 to 3, and n represents a numerical value of 13 to 26]

HOOC—R$^1$—COOH (II)

[wherein R$^1$ represents a linking group comprising a hydrocarbon chain]

H$_2$N—R$^2$—COOH (III)

[wherein R$^2$ represents a linking group comprising a hydrocarbon chain]

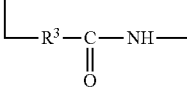
[IV]

[wherein R$^3$ represents a linking group comprising a hydrocarbon chain].

2. The copolymerized polyether polyamine resin for coating on or for impregnation to a woven or knitted fabric according to claim 1, wherein the polyether diamine compound of said formula [I] is a polyether diamine compound represented by the following formula [V], a number average molecular weight of said polyether diamine compound is from 700 to 1200, the soft segment is used in an amount of from 70 to 85% by mass to the total amount of said copolymerized polyether polyamide resin and a reduced viscosity of said copolymerized polyether polyamide resin is not less than 1.3

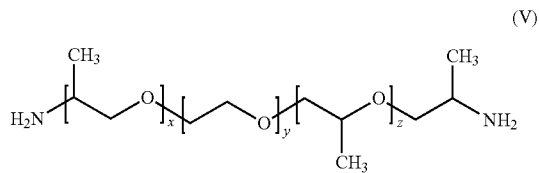

(V)

[wherein y represents a numerical value of 9.2 to 19.4, and (x+z) represents a numerical value of 3.8 to 6.0].

3. The copolymerized polyether polyamide resin for coating on or for impregnation to a woven or knitted fabric according to claim 1, wherein the dicarboxylic acid compound of said formula [II] is an aliphatic dicarboxylic acid or an alicyclic dicarboxylic acid.

4. The copolymerized polyether polyamide resin for coating on or for impregnation to a woven or knitted fabric according to claim 1, wherein $R^1$ in said formula [II] is an alkylene group having from 1 to 20 carbon atom(s).

5. The copolymerized polyether polyamide resin for coating on or for impregnation to a woven or knitted fabric according to claim 1, wherein $R^2$ in said formula [III] is an alkylene group having from 2 to 20 carbon atom(s).

6. The copolymerized polyether polyamide resin for coating on or for impregnation to a woven or knitted fabric according to claim 1, wherein $R^3$ in said formula [IV] is an alkylene group having from 3 to 20 carbon atom(s).

7. A base cloth for an airbag in which a copolymerized polyether polyamide resin for coating on or for impregnation to a woven or knitted fabric according to any of claims 1 to 6 is used as a coating agent.

8. A base cloth for an airbag in which a copolymerized polyether polyamide resin for coating on or for impregnation to a woven or knitted fabric according to any of claims 1 to 6 is used as a sealing agent.

9. A base cloth for an airbag in which a copolymerized polyether polyamide resin for coating on or for impregnation to a woven or knitted fabric according to any of claims 1 to 6 is used as an adhesive agent.

* * * * *